R. S. BRYANT.
VEHICLE WHEEL.
APPLICATION FILED OCT. 9, 1915.

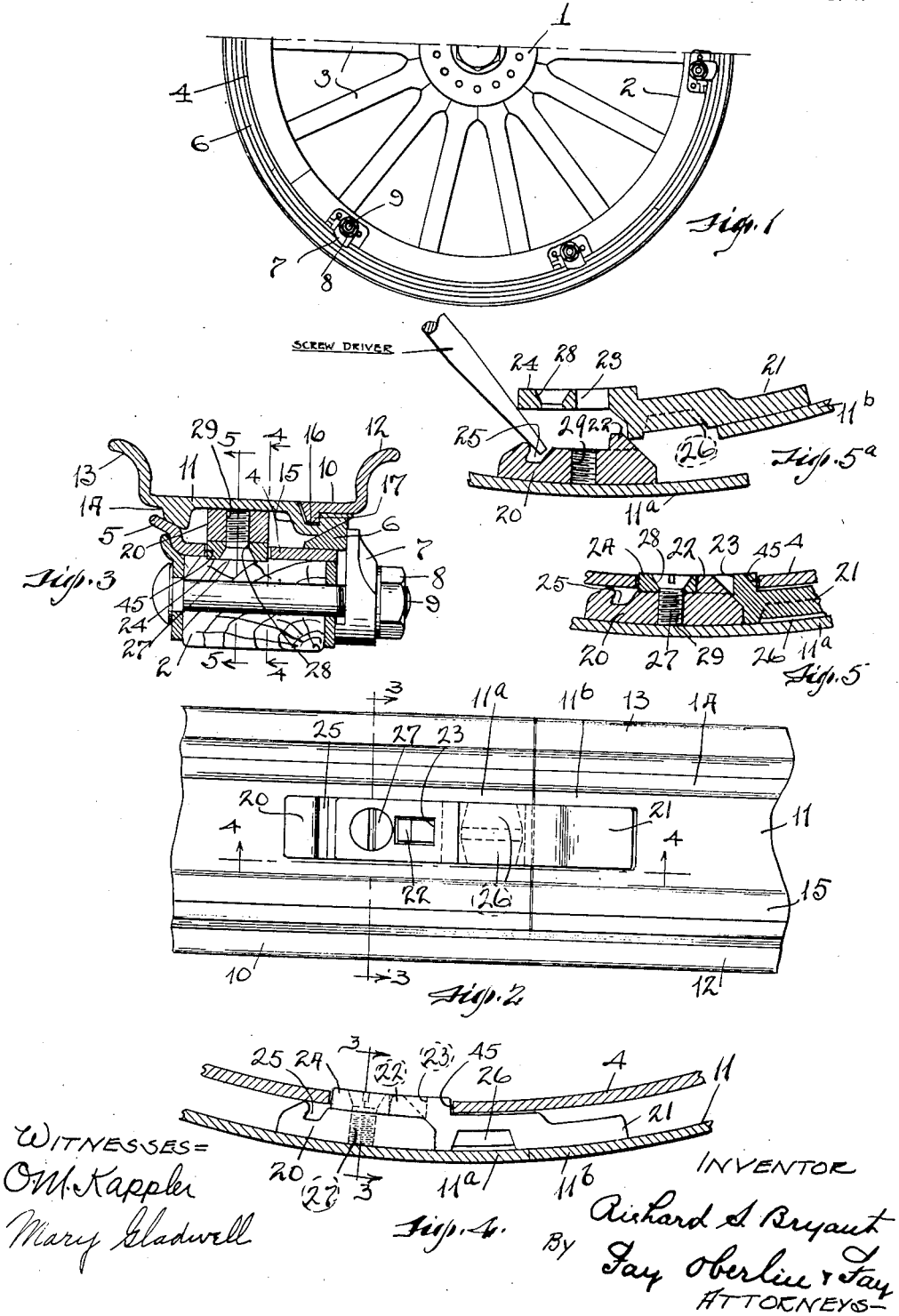

1,342,622.

Patented June 8, 1920.
2 SHEETS—SHEET 2.

WITNESSES=
O. M. Kappler
Mary Gladwell

INVENTOR
Richard S. Bryant
BY Fay, Oberlin & Fay
ATTORNEYS

UNITED STATES PATENT OFFICE.

RICHARD S. BRYANT, OF CLEVELAND, OHIO, ASSIGNOR, BY MESNE ASSIGNMENTS, TO THE STANDARD PARTS COMPANY, OF CLEVELAND, OHIO, A CORPORATION OF OHIO.

VEHICLE-WHEEL.

1,342,622.

Specification of Letters Patent.  Patented June 8, 1920.

Application filed October 9, 1915. Serial No. 54,957.

*To all whom it may concern:*

Be it known that I, RICHARD S. BRYANT, a citizen of the United States, and a resident of Cleveland, county of Cuyahoga, and State of Ohio, have invented a new and useful Improvement in Vehicle-Wheels, of which the following is a specification, the principle of the invention being herein explained and the best mode in which I have contemplated applying that principle, so as to distinguish it from other inventions.

The present improvements relate more particularly to a form of demountable tire-supporting rim for vehicle wheels, such for example as are used to carry the pneumatic tires of automobiles. As is well known, the most popular type of rim for use in this connection is a rim that may be entirely removed or dismounted from the wheel felly or wheel body, so that a completely inflated tire may be carried on a spare rim and interchanged with one on a wheel, in the event the tire on the latter is punctured or otherwise rendered unfit for use. In addition to the provision of adequate and yet conveniently operable securing means for fastening such rim on the tire when in use, it is also desirable to so construct the rim that the tire, including the outer shoe and inner tube of the double tube pneumatic tire now almost universally employed on automobiles, may be readily taken off or detached from such rim and replaced again, even though this operation is performed in the shop or garage instead of on the road.

The present improvements accordingly relate more especially still to that type of demountable rim in which the rim is wholly or partially transversely split in order that it may be collapsed, or have its circumference contracted sufficiently to permit the tire to be thus detached or attached as the case may be. Certain of the features of improvement comprehended in the present invention are applicable to various types of such so-called trans-split, demountable rims, as will be hereinafter set forth, while others relate to a particular construction of such trans-split rim. The invention, then, consists of the means hereinafter fully described and particularly pointed out in the claims.

The annexed drawings and the following description set forth in detail certain mechanism embodying the invention, such disclosed means constituting, however, but several of the various mechanical forms in which the principle of the invention may be used.

In said annexed drawings:—

Figure 6:
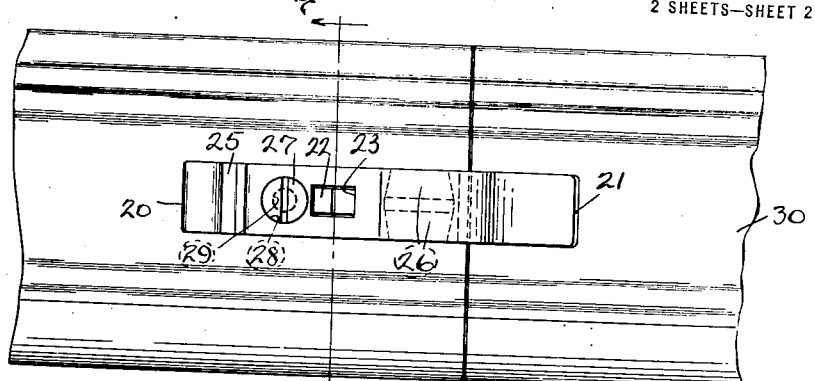
Figure 7:
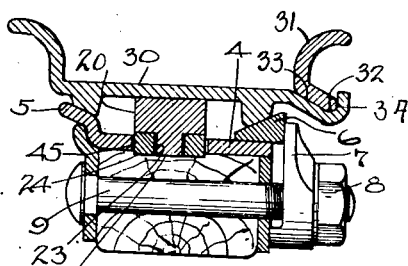
Figure 8:
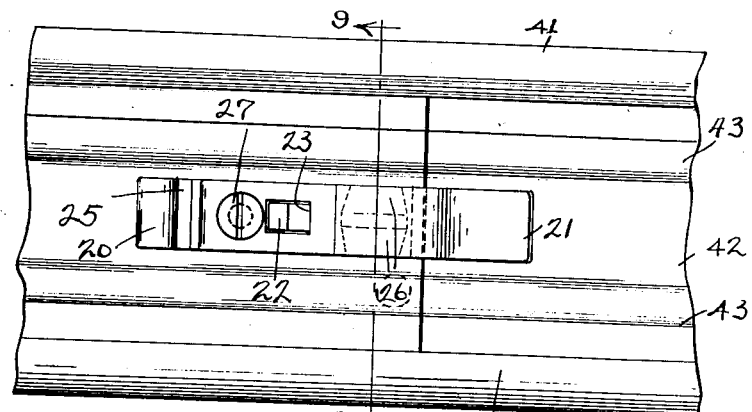

Figure 1 is a side elevational view of a portion of a wheel showing in place thereon a trans-split, demountable rim of special construction embodying my present improvements; Fig. 2 is a broken plan view of a portion of the inner face of the rim by itself, showing more especially the locking device which is employed to fasten the split ends of such rim together, and forms one of the distinctive features of the structure; Fig. 3 is a transverse section of such wheel and rim taken on the plane indicated by the line 3—3, Fig. 2; Fig. 4 is a longitudinal section thereof taken on the plane indicated by the line 4—4, Figs. 2 and 3; Fig. 5 is another longitudinal section thereof taken on the plane indicated by the line 5—5, Figs. 2 and 3; Fig. 5ᵃ is a sectional view similar to that of Fig. 5, but showing the parts in a different operative position; Fig. 6 is a plan view similar to that of Fig. 2 but showing a modified construction of rim, the same form of locking device being utilized as before; Fig. 7 is a transverse section corresponding to Fig. 3, but illustrating such modified construction of rim; Fig. 8 is a plan view similar to that of Fig. 2, but showing a second modified form of rim; and Fig. 9 is a transverse section corresponding with Fig. 3, but illustrating such second modified form of rim.

Figure 9:
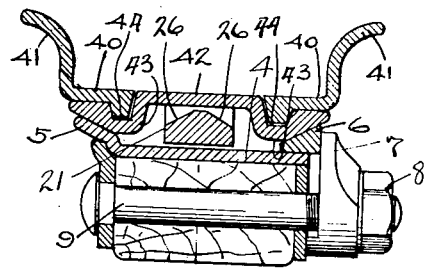

It will be noted upon referring to the transverse sectional views shown in Figs. 3, 7 and 9, that while these show different forms of rim construction, the form of locking device appearing in each is the same, just as in the case of the corresponding plan views appearing in Figs. 2, 6 and 8. However, the transverse sections in question cut through such locking device at different points circumferentially of the rim, and so all three of these sectional views should be considered in order to understand the construction of such locking device, irrespective of the form of rim associated with the latter in the views referred to, respectively.

The wheel proper, or wheel body as it may be appropriately termed, is substantially, if not identically, the same in each of the several above described constructions of rim, and the means for securing the rim onto such wheel body are likewise substantially, if not identically, the same in each case. Such wheel body, in other words, comprises, in addition to the usual hub 1, wood felly 2, and spokes 3, a felly band 4 surrounding and firmly mounted on such felly, such felly band having its one edge 5 turned up to form an inclined, or beveled, flange, which forms a continuous seat for the corresponding side of the demountable rim, when the latter is in place on the wheel. The other side of such rim is designed to be supported by a removable wedge member, or plurality of wedge members, a transversely split wedge ring 6 being illustrated in the several figures of the drawings as constitutes such member. This wedge ring is adapted to be forced inwardly by a plurality of clamps 7 carried by nuts 8 that are in turn threaded onto the projecting ends of transversely disposed bolts 9 in the felly, such clamps being rotatable into and out of engaging position with respect to the wedge ring, and also being movable toward and away from the same, so that when it is desired to remove the rim they may be turned so as to release the wedge ring and the latter then withdrawn.

The construction of rim illustrated in Figs. 1 to 5$^a$, inclusive, comprises two annular members 10 and 11, the first, a continuous band carrying one of the side-flanges 12 for engaging with the corresponding bead of the tire shoe, and the second, a discontinuous, or transversely split, band carrying the other such side flange 13. The last-named, or trans-split, rim-member is considerably wider than the first, or continuous rim-member, and is provided on its under face with two transversely spaced circumferential ribs 14 and 15 oppositely inclined, or beveled, so as to be respectively adapted to co-act with the continuous beveled flange 5 on the one side of the felly band and with the split wedge ring 9 that is designed to be inserted between the rim and such felly band along the latter's other side.

A circumferential groove 16 is formed in the outer face of the split rim-member 11 in substantial alinement with such last named rib 15, and the portion of said member projecting laterally beyond the groove is of reduced diameter compared with the main body of the member, such portion of reduced diameter being adapted to contact with and form a seat for the under side of the first, or continuous rim-member 10, and said groove being adapted to interlock with an inwardly directed rib 17 on such member, as clearly shown in Fig. 3.

From the foregoing description it will be obvious that by sufficiently contracting the split rim-member 11, as may be readily done by drawing its one end inwardly and past the other end, not only will the edge of the bead of the tire shoe which engages with the flange 13 on such member be freed, but the continuous rim-member that carries the flange 12, which engages with the other such bead, will likewise be freed, and the tire shoe, or tire complete, be thus readily detached from the rim. Conversely, when it is desired to attach a tire to the rim, the one bead thereof is slipped over such continuous rim-member, and the other member, in contracted condition, is then brought into proper position within such first member and thereupon expanded until its ends are again in alinement, thus simultantaneously bringing the flange carried by such member into proper engaging relation with the other side of the tire shoe.

In order to secure, or lock together, the ends of the split rim-member, when the latter has been thus expanded, or, in other words, such ends thus brought into alinement, the device illustrated in plan view in Fig. 2, in transverse section in Figs. 3, 7 and 9, and in longitudinal section in Figs. 4, 5 and 5$^a$, is provided. This device comprises a block, or lug 20, securely riveted, or welded, to the inner face of the rim-member in question a short distance from its one end 11$^a$, and a second block, or lug 21, similarly securely attached to the inner face of such rim at its other end 11$^b$, such second lug projecting beyond the corresponding end so as to abut or terminally contact with said first-named lug when the rim ends are in alinement, as clearly shown in Fig. 4. The abutting end of such first lug is of convex angular-shape, when viewed from the side, and the abutting end of the second lug is of complementary concave angular-shape, so that said members will radially interlock in the position in question. They are further held against longitudinal, or circumferential, displacement by means of a radially inwardly extending projection 22 on said first lug, that is adapted to seat in a recess, or aperture 23, formed in a tongue-like projection 24 of the second lug, that, in the position in question, closely overlies the major portion of the first lug. This projection 22, is beveled on the side directed toward the split in the rim member, so that, as the rim-ends are brought together, such tongue-like projection of the second lug will slide up over the same and snap into place.

To assist in bringing the parts into this desired relationship, the portion of the first lug 20 lying beyond such tongue-like projection is formed with a recess 25 on its inner face in which the end of a screw-driver, or similar implement, may be inserted and thus pressure brought to bear on the end of the tongue 24, until the projection snaps into the aperture. Recesses 26 are also formed on each side of the portion of the second lug 21, that overlies the end of the rim to which the first lug is attached, so that a suitable implement may be inserted between such second lug and the rim end, and the two thus pried apart, when it is desired to collapse or contract the rim member.

As an additional element of security, and more particularly to prevent the careless collapsing of the rim-member, while the tire on the rim is in inflated condition, a screw 27 may be passed through a smooth aperture 28 in the tongue-like projection of the second lug and threaded in a suitable threaded aperture 29 in the first lug. It will accordingly be necessary to remove this screw before the lugs can be pried apart in the fashion just described, and since the user could scarcely help but note the inflated condition of the tire by the time he had removed such screw, the latter will constitute in effect a desirable safe-guard in this connection.

The construction of rim illustrated in Figs. 6 and 7 differs from that shown in the preceding figures and described above, in that the transversely split rim-member 30 is even wider, forming a complete cylindrical supporting surface for the tire. In other words, the continuous rim member in this form consists of the side-flange 31 merely, and instead of the groove for such continuous rim member being formed in substantial alinement with the adjacent rib on the under side of the split rim member, the laterally projecting portion of such split rim-member 30 is depressed and its edge then recurved so as to provide a circumferential depression 32 having one side sloping downwardly and outwardly and the other side substantially radial with respect to the axis of the wheel. The continuous rim-member 31, consisting as stated simply of the flange, has its base portion 33 formed to seat upon the sloping or inclined side wall of this depression, while its inner edge 34 fits snugly in the corner between such surface and the radial surface, so that said flange is very solidly secured in place when the split rim-member is in expanded condition.

The third constructional form of rim, to which I show my improved locking device applied, comprises, instead of only one continuous member, two similar continuous members 40 carrying the respective side-flanges 41 of the rim, and in combination therewith a split base-member 42, which is formed with ribs 43 on its inner face presenting oppositely beveled surfaces adapted to co-act with the fixed wedge flange 5 on the felly-band and the removable split wedge ring 6, respectively. The upper face of the base is provided with two circumferential grooves 44, and the lateral portions of such base lying beyond such grooves are of reduced diameter, just as in the case of the one side of the split rim-member in first described construction.

As indicated in Fig. 9, showing a cross-section of this last described construction of rim, the side-flanges 41 may be either of the clencher type, thus adapting the rim to receive the so-called clencher tire, or of the straight-sided type to receive a correspondingly designated style of tire. Obviously this is true of the side-flanges in each of the other constructions referred to above. It will be observed that the same construction of locking device is employed to secure together the split ends of the trans-split rim member in the case of the second construction, and of the trans-split base in the case of the third construction, as is used for this purpose in the first construction. In other words, such locking device is equally adaptable to any one of the several forms of trans-split rim thus illustrated and described, and obviously may be likewise effectively used in conjunction with any form of trans-split rim, such for example as the type in which both side flanges are integral with the base, and the split extends entirely across the entire rim, base and flanges inclusive.

It will be noted that, as clearly shown in the longitudinal sectional view appearing in Fig. 4, as well as from the transverse sectional views of Figs. 3, 7 and 9, the tongue-like projections 24 of the second lug is offset from the body of such lug radially inwardly, and is adapted to fit in the correspondingly shaped recess 45 in the felly band when the rim is mounted on the latter. In such assembled condition of the parts accordingly this projection 24 serves in effect to circumferentially lock the rim on the felly-band, thus making it unnecessary to provide the rim with a special driving plate so-called, which usually interlocks with complementary driving plates on the felly-band.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. The combination with a transversely split tire-supporting rim; of a lug on one end of said rim; and another lug on the other end of said rim adapted to abut against said first-named lug and provided with a tongue adapted to over-lie the same, the abutting faces of said lugs being of complementary concave and convex form.

2. The combination with a transversely split tire-supporting rim; of a lug on one end of said rim; and another lug on the other end of said rim adapted to abut against said first-named lug and provided with a tongue adapted to over-lie the same, said first-named lug and tongue being formed to interlock in a circumferential direction, and the abutting faces of said lugs being of complementary concave and convex form.

3. The combination with a transversely split tire-supporting rim; of a lug on one end of said rim; and another lug on the other end of said rim adapted to abut against said first-named lug and provided with a tongue adapted to over-lie the same, said first-named lug and tongue being formed to interlock in a circumferential direction; and means adapted to secure said tongue to said lug in such interlocking position.

4. The combination with a transversely split tire-supporting rim; of a lug formed with a radially inwardly directed projection on one end of said rim; another lug on the other end of said rim adapted to abut against said first-named lug and provided with a tongue adapted to over-lie the same, said tongue having a recess adapted to register with said projection.

5. The combination with a transversely split tire-supporting rim; of a lug formed with a radially inwardly directed projection on one end of said rim; another lug on the other end of said rim adapted to abut against said first-named lug and provided with a tongue adapted to overlie the same, said tongue having a recess adapted to register with said projection; and means adapted to positively secure said tongue to said lug in such interlocking position.

6. The combination with a transversely split tire-supporting rim; of a lug formed with a radially inwardly directed projection on one end of said rim; another lug on the other end of said rim adapted to abut against said first-named lug and provided with a tongue adapted to over-lie the same, said tongue having a recess adapted to register with said projection; and a screw adapted to secure said tongue to said lug in such interlocking position.

7. The combination with a transversely split tire-supporting rim; of a lug on one end of said rim; and another lug on the other end of said rim adapted to abut against said first-named lug and provided with a tongue adapted to over-lie the same, said first-named lug being formed with a recess on its inner face at a point adjacent to, but beyond the end of said tongue when in such over lying position.

8. The combination with a transversely split tire-supporting rim; of a lug on the inner face of said rim a short distance from one end thereof; and another lug on the inner face of said rim at its other end, said second lug extending beyond such end so as to terminally abut with said first lug when said rim-ends are in alinement, and the abutting faces of said lugs being of complementary concave and convex form, substantially as described.

9. The combination with a transversely split tire-supporting rim; of a lug on the inner face of said rim a short distance from one end thereof; and another lug on the inner face of said rim at its other end, said second lug extending beyond such end so as to terminally abut with said first lug when said rim-ends are in alinement, and the abutting faces of said lugs being of complementary concave and convex angular form, substantially as described.

10. The combination with a transversely split tire-supporting rim; of a lug on the inner face of said rim a short distance from one end thereof; and another lug on the inner face of said rim at its other end, said second lug extending beyond such end so as to terminally abut with said first lug when said rim-ends are in alinement, and the extending portion of said second lug having a recess formed in its side, substantially as described.

Signed by me this 2nd day of October, 1915.

RICHARD S. BRYANT.

Attested by—
M. H. WILLIAMS,
R. C. COOLEY.